United States Patent [19]
Lermite et al.

[11] Patent Number: 5,456,823
[45] Date of Patent: Oct. 10, 1995

[54] PROCESS FOR DEHYDRATION AND/OR DESALINATION AND FOR SIMULTANEOUS FRACTIONATION OF A PETROLEUM DEPOSIT EFFLUENT

[75] Inventors: Christophe Lermite, Paris; Joseph Larue, Chambourcy; Alexandre Rojey, Rueil Malmaison, all of France

[73] Assignee: Institut Francais du Petrole, Rueil Malmaison, France

[21] Appl. No.: 176,480

[22] Filed: Dec. 30, 1993

[30] Foreign Application Priority Data

Dec. 30, 1992 [FR] France ................................. 92 16032

[51] Int. Cl.$^6$ .................................................... C10G 7/00
[52] U.S. Cl. ...................... 208/308; 208/340; 208/347; 208/348; 208/349; 208/350; 208/351; 208/353; 208/354; 208/355; 208/356; 208/357; 208/358; 208/364; 208/365; 208/187
[58] Field of Search ................................. 208/187, 308, 208/340, 347, 348, 349, 350, 351, 353, 354, 355, 356, 357, 358, 364, 365

[56] References Cited

U.S. PATENT DOCUMENTS

| | | | |
|---|---|---|---|
| 3,121,056 | 2/1964 | Hull | 208/365 |
| 3,425,935 | 2/1969 | Cahn | 208/348 |
| 3,441,499 | 4/1969 | Francis, Jr. et al. | 208/187 |
| 3,453,205 | 7/1969 | Francis, Jr. et al. | 208/187 |
| 4,082,653 | 4/1978 | De Graff | 208/349 |

OTHER PUBLICATIONS

Perry's Chemical Engineers' Handbook, 6th Edition, 1984 pp. 11–21 Through 11–24.

*Primary Examiner*—Anthony McFarland
*Assistant Examiner*—Walter D. Griffin
*Attorney, Agent, or Firm*—Millen, White, Zelano, & Branigan

[57] ABSTRACT

A process for the dehydration and/or desalination and simultaneous fractionation of a petroleum deposit effluent containing oil, associated gas and water which can be saline, which process comprises:

(a) at least one step for separating the liquid and gaseous phases at the pressure P1 for removal of the gas, producing a gaseous fraction G1, on the one hand, which is removed and a liquid fraction L1, on the other hand, which is sent to step (b) at least one step for separating, at least partly, the two liquid phases mixed in the liquid fraction L1, the aqueous phase being partly removed and the oil phase containing a quantity of residual aqueous phase being sent to step (c);

(c) at least one distillation step carried out at a pressure P2 which is less than, or at the most equal to, the pressure P1 in step (a), in a distillation zone C1, said distillation being carried out in the presence of the oil phase coming from step (b), said zone C1 comprising an internal heat exchange zone and a boiling zone, and enabling a gaseous fraction G2, on the one hand, and a liquid fraction L2, on the other hand, to be recovered, said fraction L2 being constituted by a liquid oil phase and an aqueous liquid phase which is not miscible with the liquid oil phase; and (d) at least one step for separating the two liquid phases mixed in the liquid fraction L2, the oil phase being sent into said internal exchange zone, and then removed.

18 Claims, 2 Drawing Sheets

PROCESS FOR DEHYDRATION AND/OR DESALINATION AND FOR SIMULTANEOUS FRACTIONATION OF A PETROLEUM DEPOSIT EFFLUENT

BACKGROUND OF THE INVENTION

The invention is concerned with a process for dehydration and/or desalination and simultaneous fractionation of a petroleum deposit effluent containing oil, associated gas and water which can be saline.

Treating a petroleum deposit effluent usually comprises an oil-gas fractionation step which is intended to adjust the droplet point of the oil produced in order to make it thermodynamically stable under storage conditions.

The treatment also generally comprises a step in which an aqueous liquid phase which is not miscible with the oil phase is separated and which may possibly both be saline. In fact, an aqueous phase is usually produced at the same time as the liquid and gaseous hydrocarbons, and must be removed in order to satisfy water content requirements and salt content requirements in the oil produced. Moreover, to reduce the content of salt in the oil produced, it is often necessary to remove salt from the oil by mixing the oil with fresh water or water whose salt content is less than that of the water produced at the same time as the oil, then separating the liquid phases of water and oil.

The treatment can also comprise a de-acidification step of the oil produced, this step consisting mainly of extracting the major part of the sulfurated hydrogen ($H_2S$) for toxicity and corrosion related reasons.

These steps are usually simultaneous, the production effluent undergoing a series of successive expansions, usually 3 or 4, from the pressure at which the effluent issues from the well to a pressure close to atmospheric pressure, with, on each expansion, removal or recompression of the gas produced and removal of the aqueous phase by decantation possibly with fresh water being injected between expansions to produce a desalination effect. The effluent is usually heated before the last expansion in order to satisfy vapor pressure requirements and $H_2S$ requirements of the oil produced, and to facilitate separation of the aqueous phase.

For the oil produced, the necessary requirements are as follows:

For vapor pressure, the criterium usually held is the vapor pressure at 37.8° C. expressed in Pascals, or Reid Vapor Pressure (RVP). This requirement is usually between 8 and 12 p.s.i.

For the $H_2S$ content, the usual requirement is 60 ppm by weight.

For the water content, the requirement is usually between 0.5 and 1%.

The gas produced on each expansion contains heavy constituents ($C_4^+$) which it is not necessary to draw off from the oil to stabilize it. It is desirable to recover these heavy constituents to reinject them into the oil because this increases the amount of stabilized oil produced, whilst lowering its density which will increase its selling value. Moreover, the presence of these heavy constituents in the gas produced confers upon it a high hydrocarbon dew point which is unfavourable in terms of its marketing.

Recompression of the gas produced on each expansion and also partial condensation thereof by cooling allows a part of the heavy constituents to be recovered, but also excessively increases investment costs as the amount of compression needed increases.

SUMMARY OF THE INVENTION

It has been discovered that oil-gas fractionation, on its own or in association with de-acidification of the oil produced, can be carried out with a high oil yield and with considerable savings being made on the amount of heating, on the amount of compression and in the size of the installation, and this can be particularly important in a context such as marine petroleum production.

It has also been discovered that the water which is usually produced with liquid and gaseous hydrocarbons makes a favourable contribution to the fractionation of the oil and gas.

It has also been discovered that these treatment operations can be carried out in at least one expansion step unless it is normal practice to carry out the fractionation operations by way of successive expansions.

Generally speaking, the process for dehydration and/or desalination and simultaneous fractionation of a petroleum deposit effluent containing oil, associated gas and water which can be saline is characterised in that it comprises:

(a) at least one step where the liquid and gaseous phases are separated at the pressure P1 for removal of the gas, producing, on the one hand, a gaseous fraction G1 which is removed, and, on the other hand, a liquid fraction L1 which is sent to step (b);

(b) at least one step where the two liquid phases mixed in the liquid fraction L1 are at least partly separated, the aqueous phase being partly removed and the oil phase which contains a residual quantity of aqueous phase being sent to step (c), (c) at least one distillation step which is carried out at a pressure P2 which is less than or at the most equal to the pressure P1 in step (a), in a distillation zone C1, said distillation being carried out in the presence of the oil phase coming from step (b), said zone C1 comprising an internal heat exchange zone and a boiling zone, and enabling a gaseous fraction G2 to be collected, on the one hand, and a liquid fraction L2 to be collected, on the other hand, said fraction L2 being constituted of a liquid oil phase and of an aqueous liquid phase which is not miscible with the liquid oil phase, and (d) at least one step For separating the two liquid phases which are mixed in the liquid Fraction L2, the oil phase being sent to said internal exchange zone, and then removed.

It has also been discovered that by using an internal heat exchange zone it is possible to make substantial savings on the heat which is to be supplied to the boiler for distillation zone C1.

It has also been discovered that if the treated effluent contains an acid gas, and, in particular, $H_2S$, it is possible to satisfy the two requirements of thermodynamic stability and $H_2S$ content by adjusting the temperature of the boiler and the number of stages in the distillation step. In particular, by virtue of the separating power of the distillation operation, the present invention makes it possible for $H_2S$ to be removed to the specification for effluents containing up to several % by weight of $H_2S$, and this without any loss of high grade hydrocarbons ($C_4^+$) from the top of the distillation zone.

It has also been discovered that the internal heat exchange zone enables the distillation residue to be cooled, thereby increasing the thermodynamic stability thereof and making savings on subsequent cooling.

Another discovery, and one which forms one of the main objects of the present invention, is that the presence of water in the effluent treated during step (c) of the process according to the invention brings about heteroazeotropic distillation which helps increase efficiency of the oil and gas fractionation.

The process according to the invention will be described in further detail hereinafter in conjunction with FIG. 1. The description is directed, more particularly, to the treatment of a petroleum deposit effluent containing oil, associated gas and water which can be saline.

Figure 1:
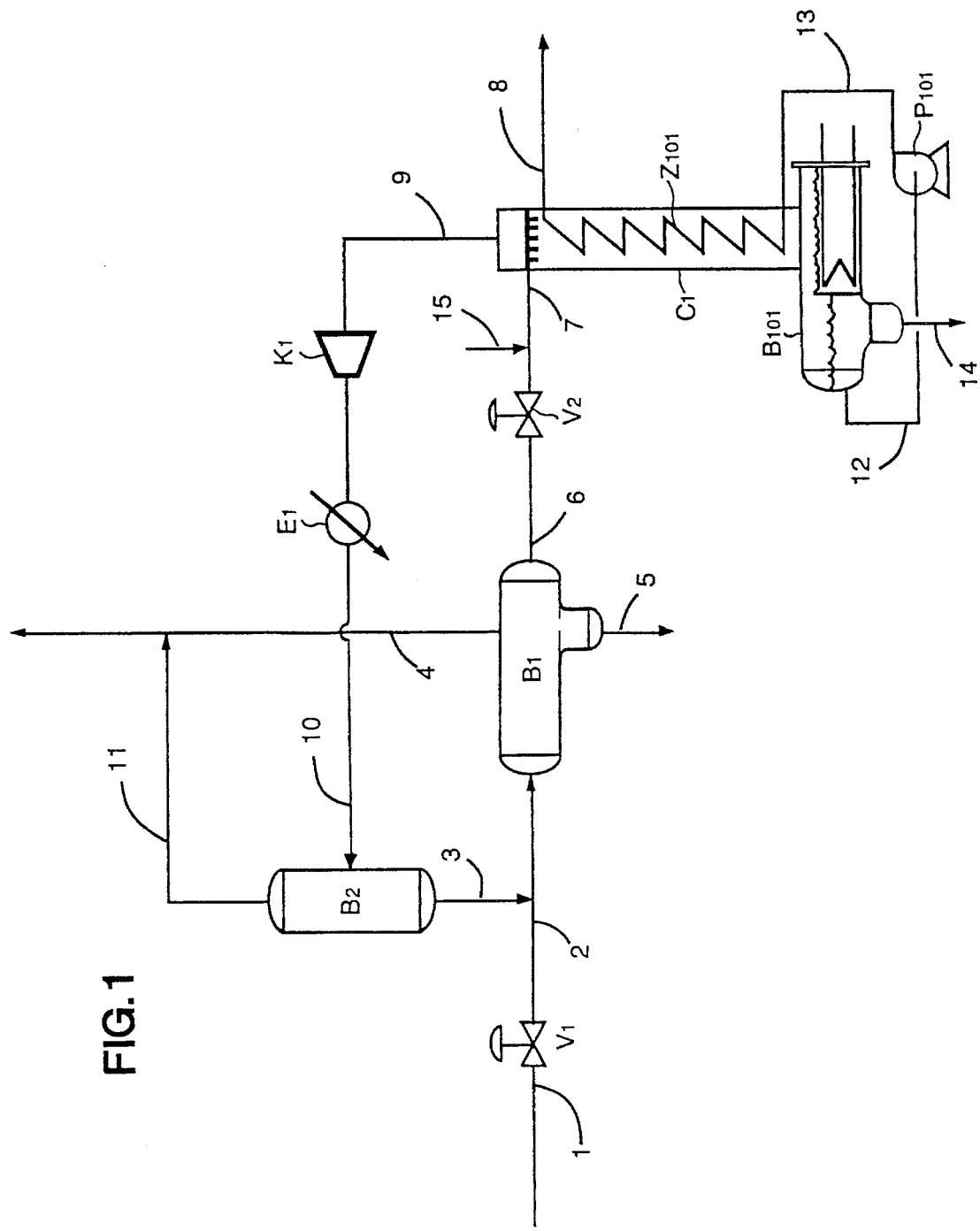
FIG. 1 depicts one embodiment of an apparatus system for conducting the process of the invention.

The effluent to be treated arrives via the conduit 1. It is expanded at the pressure P1 for removal of the gas (between 1 and 10 MPa, fop example) in the valve V1, whence it issues in a partly vaporized state through the conduit 2 and is mixed with a liquid fraction coming from the flask B2 arriving through the conduit 3.

The phases of the mixture thus obtained are separated in the flask B1. The gaseous phase is removed through the conduit 4, possibly mixed with a gaseous phase coming from the flask B2 arriving via the conduit 11, and removed from the process. The aqueous phase is partly removed from the process via the conduit 5. The liquid hydrocarbon phase containing a small fraction of the aqueous phase which has not been separated (fop example, between 1% and 5%) is removed via the conduit 6, and is then expanded in a valve V2 until a pressure P2 between the pressure P1 and atmospheric pressure is reached. The pressure F2 is between 0.15 and 1 MPa, for example.

The hydrocarbon phase issuing from the valve V2 via the conduit 7 can be mixed with a quantity of fresh water which circulates in the conduit 15 (this quantity of water can be between 10 and 100% of the quantity of oil circulating in the conduit 6) in order to reduce its salt content by the effects of dilution; the mixture obtained is introduced (step (c)) into the distillation zone C1. This distillation zone comprises a boiling zone B101 and an internal heat exchange zone Z101 into which the liquid oil phase coming from step (d) and issuing from said boiling zone B101 by rising along said internal heat exchange zone Z101 reheats the liquid L1 and the vapor circulating counter-current in the distillation zone C1. The aqueous phase injected though the conduit 15 can be constituted preferably of fresh water, but also of water with a salt content of less than that of the residual aqueous phase contained in the oil phase circulating in the conduit 6 in such a way as to have a desalination effect.

The boiling zone B101 is constituted of two parts: in the part disposed under the distillation zone C1, the mixture of the two liquid oil and water phases is brought to boiling point by the external application of heat, whilst in a lateral part separated by a vertical baffle and supplied by an overflow of liquid over said baffle, the two liquid oil and water phases are separated by decantation, which enables the aqueous phase to be removed via the conduit 14, and the oil phase to be removed via the conduit 12 by means of the pump P101.

The temperature in the boiling zone B101 is usually between 100° C. and 250° C., and preferably between 100° C. and 150° C.

The residue from the distillation operation is composed of an oil phase and an aqueous phase which are separated by decantation; the oil phase satisfies Reid Vapor Pressure requirements (RVP requirements), $H_2S$ and water content. After rising through the internal heat exchange zone Z101, the oil phase is removed via the conduit 8.

The vapor distillate is removed via the conduit 9; it can be at least partly recompressed in the compressor K1, from the pressure P2 to the pressure P1, then usually cooled in the heat exchanger E1 by an external fluid which can, for example, be water, or air, or any other cooling fluid available locally. This sequence of recompression and cooling enables a liquid phase which has a large content of high grade hydrocarbons to be condensed. Since the quantity of liquid fraction arriving in the distillation zone C1 via the conduit 7 is much greater than the quantity of gas issuing through the conduit 9, the temperature of the gas issuing from the distillation zone C1 via the conduit 9 is close to the temperature of the liquid fraction circulating in the conduit 7. It is usually between 40° and 80° C.

The liquid-vapor mixture thus formed is removed from the heat exchanger E1 to the flask B2 via the conduit 10. The liquid fraction constituted of a mixture of a liquid oil phase and a liquid aqueous phase is removed from the flask B2 via the conduit 3 and is mixed with the effluent coming from the valve V1 and arriving via the conduit 2, so as to be sent to the flask B1 (step (a), as already described, hereinabove. Since the liquid aqueous phase obtained after condensation at the exit from the exchanger E1 is constituted of water with a salt content of virtually zero, since it originates from condensation, it can be separated and reinjected through the conduit 15 in such a way that it contributes to the desalination process.

The vapor phase is removed from the flask B2 via the conduit 11 and is mixed with a gaseous fraction coming from the flask B1 and arriving via the conduit 4, as already described hereinabove.

Recompression of the gaseous phase issuing from the top of the column C1 can be effected in one or more compression steps; it is, however, advantageous if the recompression is effected in one single step in order to limit the number of compressors; to this end, the value of the pressure P2 can be selected which is intermediate between the pressure P1 and atmospheric pressure P0 and in a ratio such that P2/P0 is at least equal to half of P1/P2, for example.

Of course, the gaseous phase G2 which is recompressed at the pressure P1 could be mixed with the gaseous phase G1 and removed from the process directly without cooling, but it is much more advantageous to cool the gaseous phase G2 after recompression in order to condense a part of the phase G2, and, after separation in the flask B2, to recycle the liquid phase thus obtained to the flask B1, as already described hereinabove.

Figure 2:
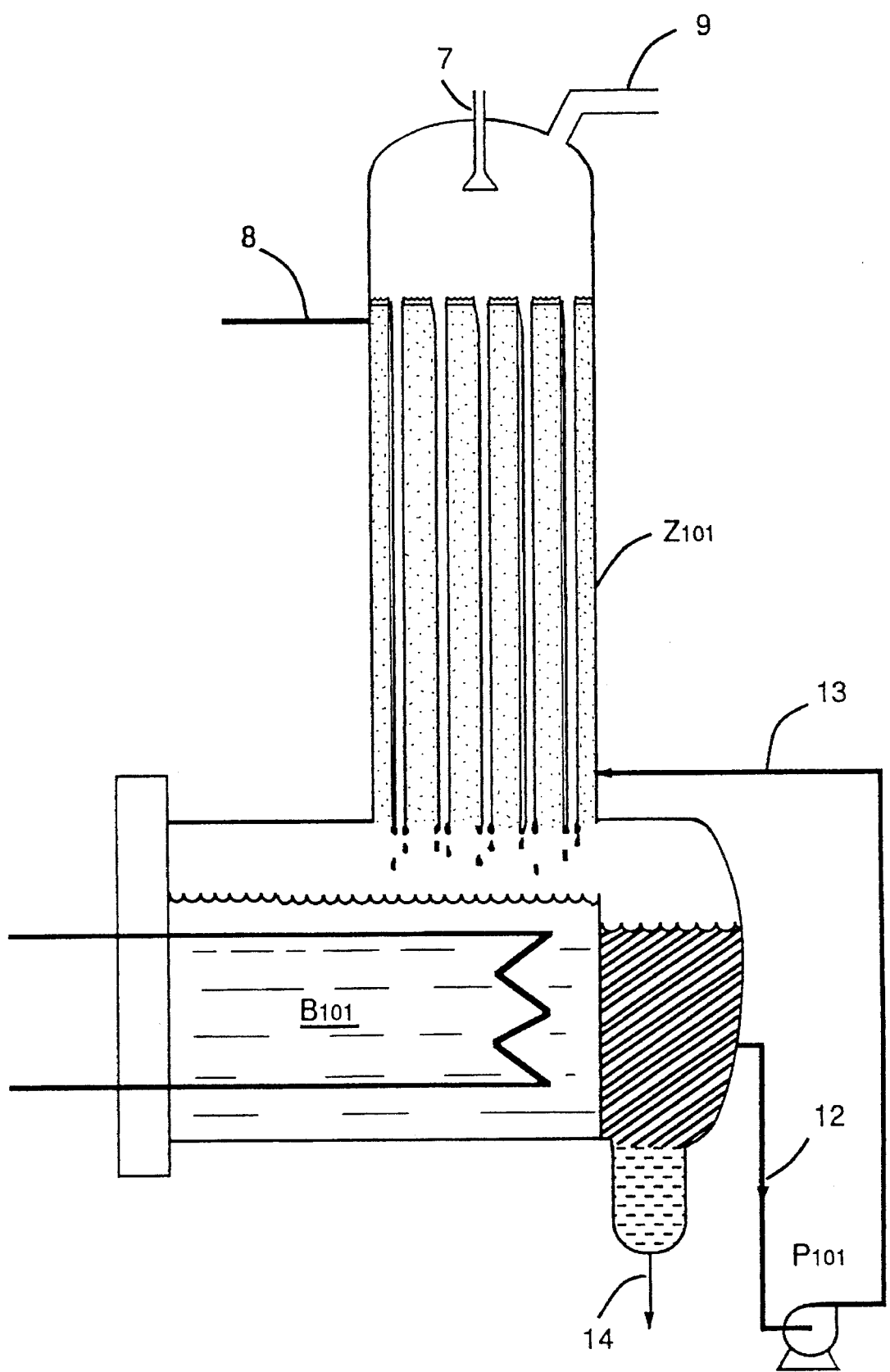
FIG. 2 depicts one embodiment of a distillation zone C1 with boiling zone usable for the process of the invention.

To carry out step (c) of the process according to the invention, it is possible to carry out the step in a device such as that described hereinafter in conjunction with FIG. 2.

The device mainly comprises:

A boiling zone B101 constituted of a flask which has, on the one hand, a capacity which enables a boiling device known in the art, such as an electric heating device, a pin for the circulation of a heat conductive fluid, or a heating tube, for example, to be immersed in the residue from the distillation operation, and the flask comprising, on the other hand, a decantation zone which is separated by a vertical baffle of the above-mentioned size and in which zone the two liquid oil and water phases are separated by decantation which enables the aqueous phase to be removed via the conduit 14 and the oil phase to be removed via the conduit 12 by the pump P101; and an internal heat exchange zone Z101 which is placed above the boiling zone and which is constituted by two circulation spaces; the mixture of oil to be degassed and of water arriving at the top of the distillation device C1 via the conduit 7 flows by the force of gravity, countercurrent to the vapor rising in the boiling zone B101 through said internal heat exchange zone Z101, said vapor then being removed from the distillation device C1 via the conduit 9. In the other space, the liquid oil phase which issues from the boiling zone B101 flows from the bottom to the top via the conduit 12 by means of the pump P101 and re-enters the heat exchange zone via the conduit 13, and then issues from said heat exchange zone Z101 via the conduit 8.

The internal heat exchange zone Z101 can be designed in various ways, some of which will be described hereinafter.

By way of example, the internal heat exchange zone Z101 can be constituted of vertical tubes in which the mixture of oil to be degassed and water flows in the form of a film which falls onto the inner walls of the tubes, whilst the liquid phase of oil which rises in the boiling zone B101 circulates outside the tubes in the calendria. The inner wall of said vertical tubes can be smooth, but they can also have regions of unevenness, or they can be subjected to a surface treatment to promote transfer of material and heat between the phases circulating inside the tubes, and also promoting transfer of heat between the phases circulating on either side of the tube walls. By way of example, the geometry of the inner surface of the tubes can be such that it promotes the appearance of waves within the falling liquid film, or it can be such that it has channels in the axis of the tubes in such a way as to increase the inner surface area of them, or it can be provided with a deposit of solid agglomerated particles which promote nucleation of vapor droplets within the falling liquid film. The inner wall of the tubes is preferably moistened by the oil phase.

Said vertical tubes can also be filled with a bulk filling, ie., packing material such as with balls, rings, or saddle-shaped members. Preferably, the largest dimension of a filling element is less than one eighth the diameter of said tubes.

Said vertical tubes can also be filled with a structured filling constituted, for example, of metal gauze, metal wool, plates or crosspieces such as used, for example, in static mixers.

Another possible configuration consists in contacting the outer surface of the tubes with the oil mixture to be degassed and with the water and the vapor rising from the boiling zone B101 through the calendria, the liquid phase of oil rising by the pump P101 From the boiling zone B101 inside the tubes. In this case, the calendria can be empty or filled with a bulk or structured filling. In this case, the outer surface of the tubes can be smooth or it can have regions of unevenness, or it can be subjected to a surface treatment which will promote transfer of material and heat transfer between the phases circulating outside the tubes, and also transfer of heat between the phases circulating on either side of the tube walls.

The outer wall of the tubes is preferably moistened by the oil phase.

The internal heat exchange zone Z101 can also be structured in such a way that the two circulation spaces are delimited by an assembly of vertical plates.

The distillation device C1 can also comprise a distribution device for the mixture of oil to be degassed and of water in the corresponding circulation space of the internal heat exchange zone Z101 when this space is composed of many parts (for example, constituted by tubes). These devices are known to those skilled in the art.

The following example illustrates the invention.

EXAMPLE

In this example, the procedure followed is the same as illustrated in FIG. 1. The effluent to be treated which is a crude petroleum issuing from the production well arrives via the conduit 1 at a flow rate of 169.3 ton/h, of which 31.3 ton/h is free water; its temperature is 60° C., its pressure is 30 MPa. It is expanded until the pressure P1 of 3 MPa is reached in the valve V1, whence it issues via the conduit 2 at the temperature of 37° C. It is then mixed with a liquid L3 which comes From the flask via the conduit 3 at a flow rate of 2.15 ton/h, of which 155 kg/h is free water; this liquid is at a temperature of 35° C. and at a pressure of 3 MPa. The mixture thus obtained is sent to the flask B1 where the gaseous phase is completely separated from the liquid phases which are partially separated. The gaseous phase G1 is removed via the conduit 4 at a flow rate of 72.1 ton/h; the liquid L1 which is formed of a majority hydrocarbon phase and a minority aqueous phase is removed through the conduit 6 to the valve V2 at a flow rate of 68.5 ton/h, of which 321 kg/h is aqueous phase; the aqueous liquid phase is removed from the process via the conduit 5 at a flow rate of 30.88 ton/h. In the valve V2, the liquid phase L1 is expanded at a pressure P2 of 1 MPa, and partly vaporized, and then mixed with a liquid aqueous phase L4, the salt content of which is very much less than saturation, which arrives through the conduit 15 at a flow rate of 2583 kg/h. The liquid-phases and the vapor phase thus obtained are at a temperature of 32° C. and they enter the distillation zone C1 which comprises an internal heat exchange zone Z101 and a boiling zone B101 via the conduit 7. The temperature in the boiling apparatus B101 is 132° C. The internal heat exchange zone Z101 is constituted of vertical tubes in which the oil to be degassed flows in the form of a film which falls on the inner walls of the tubes. The anhydrous hydrocarbon liquid phase L2 which issues from the boiling zone B101 by the pump P101 at 132° C. is returned to the internal heat exchange zone Z101 in which it circulates outside the tubes, and it is then removed from the top of the distillation zone C1 via the conduit 8 at 62° C. at a flow rate of 50.9 ton/h. The aqueous phase is completely decanted in the boiling apparatus B101 and is removed from the process via the conduit 14 at a flow rate of 2736 kg/h. The vapor phase G2 is removed from the top of the distillation zone Ci via the conduit 9 at a flow rate of 17.45 ton/h at a temperature of 53° C.

Issuing from the distillation zone C1 via the conduit 9, the gaseous phase G2 enters the compressor K1 which has an output of 520 kW, whence it re-emerges at the pressure of 3 MPa and at a temperature of 110° C. and enters the heat exchanger El. In the heat exchanger El, the gaseous phase G2 is cooled to 35° C. by cooling water external to the process, and this cooling operation causes condensation of a fraction of the gas in the form of a liquid L3. The mixture is removed from the heat exchanger E1 via the conduit 10 and is sent to the flask B2 in which the gaseous phase is separated from the liquid phases. The liquid LB formed from the hydrocarbon and aqueous liquid phases is mixed with the fluid coming from the valve V1 via the conduit 2, the gaseous phase is removed via the conduit 11 and is mixed with the gaseous phase G1 which circulates in the conduit 4, and the gaseous phase resulting from this mixture is removed at a temperature of 36° C. and at a flow rate of 87.4 ton/h.

It has been stated hereinabove that the presence of water in the effluent treated during step (c) of the process according to the invention results in a heteroazeotropic distillation which helps increase the efficiency of the oil and gas fractionation. This is confirmed by the following comparison: if, in the example given hereinabove, the hydrocarbon and aqueous liquid phases ape completely separated in the flask B1, and if the liquid aqueous phase L4 arriving via the conduit 15 is suppressed, the liquid L1 entering the distillation zone C1 is anhydrous. With the same specification for the oil produced and with the same temperature in the boiling apparatus B101, the pressure in the distillation zone C1 must then be decreased to 716 kPa, and the output of the compressor K1 is increased to 690 kW.

We claim:

1. A process for dehydration and/or desalination and simultaneous fractionation of a petroleum deposit effluent containing oil, associated gas and water, which is optionally saline, which process comprises:

(a) separating the petroleum deposit effluent containing oil, associated gas and water at a pressure P1 to produce a gaseous fraction G1 and a liquid fraction L1 comprising an oil phase and an aqueous phase, and removing the gaseous fraction, (b) partly separating the liquid fraction L1 to produce a separated aqueous phase, which is removed, and an oil phase containing a residual quantity of aqueous phase, (c) distilling, in at least one distillation step, at a pressure P2 which is less than or equal to the pressure P1 in step (a), said oil phase comprising a residual quantity of aqueous phase produced in step (b) in a distillation zone (C1) comprising an internal heat exchange zone, having a plurality of vertical tubes surrounded by a calandria, and a boiling zone, wherein said oil phase comprising a residual quantity of aqueous phase flows as a falling film inside the vertical tubes, to produce a gaseous fraction G2 and a liquid fraction L2 which comprises a liquid oil phase and a liquid aqueous phase immiscible with the liquid oil phase, (d) separating said liquid fraction L2 to produce a separated oil phase and separated aqueous phase, and (e) passing the separated oil phase through the calandria outside of and in an indirect heat exchange relationship with the vertical tubes in the internal heat exchange zone.

2. The process of claim 1, wherein the distillation step (c) is carried out at a pressure P2 which is intermediate between the pressure P1 at which step (a) is carried out and atmospheric pressure P0, the P2/P0 ratio being at least equal to half the P1/P2 ratio.

3. The process of claim 1, further comprising adding an aqueous fraction to the oil phase containing a residual quantity of aqueous phase from step (b) before it is distilled in step (c).

4. The process of claim 3, wherein the salt concentration of the aqueous fraction added to the oil phase containing a residual quantity of aqueous phase from step (b) before it is distilled in step (c) is less than that which exists in the residual aqueous phase from step (b).

5. The process of claim 1, further comprising recompressing the gaseous fraction G2, then cooling and at least partly condensing it to obtain a liquid fraction being a mixture of a hydrocarbon phase and of an aqueous phase separating the hydrocarbon phase and recycling it to step (a).

6. The process of claim 5, further comprising adding, at least partly, the aqueous phase obtained by partial condensation of the gaseous phase G2 to the oil phase containing a residual quantity of aqueous phase from step (b) before it is distilled in step (c).

7. The process of claim 1, wherein the temperature for the distillation in step (c) is between 100° C. and 150° C.

8. The process of claim 1, wherein the temperature of the gaseous fraction G2 removed at the top of the distillation zone (C1) is between 40° and 80° C.

9. The process of claim 1, wherein the separated oil phase coming from the liquid fraction L2 circulates in the calandria from the bottom to the top of the internal heat exchange zone, generally against the flow of the oil phase containing a residual quantity of aqueous phase which descends in the vertical tubes of the distillation zone.

10. The process of claim 1 wherein the inner wall of the tubes is moistened by the oil phase.

11. The process of claim 1, wherein the vertical tubes are filled with a packing material.

12. The process of claim 1, wherein the water in the petroleum deposit effluent is saline and the process results in desalination of the petroleum deposit effluent.

13. The process of claim 1, wherein the petroleum deposit effluent contains $H_2S$ and said $H_2S$ is at least partially removed from the petroleum deposit effluent by the process.

14. The process of claim 1, wherein the water is present in the oil phase introduced into the distillation zone in sufficient amount to result in heteroazeotropic distillation in the distillation zone.

15. The process of claim 1, wherein the residual quantity of aqueous phase in the oil phase from the separation step (b) is between 1% and 5%.

16. The process of claim 3, wherein the quantity of the aqueous fraction added to the oil phase between steps (b) and (c) is between 10 and 100% of the quantity of the oil phase.

17. The process of claim 1, wherein the temperature in the boiling zone is between 100° C. and 250° C.

18. The process of claim 19, wherein the separated oil phase product has a Reid Vapor Pressure of between 8 and 12 p.s.i., an $H_2S$ content of 60 ppm or less and a water content of between 0.5 and 1%.

* * * * *